United States Patent
Kronenberger (10) Patent No.: US 10,292,442 B2
(45) Date of Patent: *May 21, 2019

(54) ADORNMENT ASSEMBLY FOR AN ARTICLE

(71) Applicant: Ronald Kronenberger, Riverwoods, IL (US)

(72) Inventor: Ronald Kronenberger, Riverwoods, IL (US)

(*) Notice: Subject to any disclaimer, the term of this patent is extended or adjusted under 35 U.S.C. 154(b) by 469 days.

This patent is subject to a terminal disclaimer.

(21) Appl. No.: 14/883,954

(22) Filed: Oct. 15, 2015

(65) Prior Publication Data
US 2016/0044977 A1    Feb. 18, 2016

Related U.S. Application Data

(63) Continuation-in-part of application No. 14/323,157, filed on Jul. 3, 2014.

(51) Int. Cl.
    *A42B 1/24* (2006.01)
    *B32B 5/06* (2006.01)
    (Continued)

(52) U.S. Cl.
    CPC .............. *A41D 27/08* (2013.01); *A42B 1/248* (2013.01); *B32B 5/06* (2013.01); *B32B 5/26* (2013.01);
    (Continued)

(58) Field of Classification Search
    CPC ...... A41D 27/08; A41D 27/085; A42B 1/248; B32B 2451/00; Y10T 428/216; Y10T 428/24736; Y10T 428/1486
    (Continued)

(56) References Cited

U.S. PATENT DOCUMENTS 2,636,837 A    4/1953    Summers
5,452,479 A    9/1995    Mostert
(Continued)

FOREIGN PATENT DOCUMENTS

GB    2107649 A    5/1983

OTHER PUBLICATIONS

University of Central Florida, Presentation Alphabet Set: Columbia Blue, Gold & Navy Blue, https://web.archive.org/web/20120221033725/http://etc.usf.edu:80/presentations/extras/letters/varsity_letters/31/index.htmlk archived Feb. 21, 2012 (Year: 2012).*

(Continued)

*Primary Examiner* — Lynda Salvatore
(74) *Attorney, Agent, or Firm* — Wood, Phillips, Kats, Clark & Mortimer (57) ABSTRACT

An adornment assembly for an article has a base assembly made up of a plurality of layers in stacked relationship. A first of the layers has a thickness between oppositely facing first and second surfaces. A second layer has a thickness between oppositely facing third and fourth surfaces. The first surface is for application to an exposed surface on an article. The base assembly has an exposed surface on one of the layers that faces oppositely to the first surface. A discrete component has a thickness between oppositely facing surfaces and is applied to the base assembly so that one of the oppositely facing component surfaces is exposed for viewing together with the exposed surface on the one of the plurality of layers on the base assembly. At least a part of the thickness of the discrete component resides within the combined thickness of the base assembly.

22 Claims, 8 Drawing Sheets

(51) Int. Cl.
     *B32B 5/26*     (2006.01)
     *B32B 7/08*     (2019.01)
     *B32B 7/12*     (2006.01)
     *A41D 27/08*    (2006.01)
(52) U.S. Cl.
     CPC ............... *B32B 7/08* (2013.01); *B32B 7/12* (2013.01); *B32B 2437/00* (2013.01); *B32B 2437/04* (2013.01); *B32B 2451/00* (2013.01)
(58) Field of Classification Search
     USPC ...... 428/66.5, 79, 542.2, 67.189–190; 2/244, 2/246
     See application file for complete search history.

(56) References Cited

U.S. PATENT DOCUMENTS

| | | | |
|---|---|---|---|
| 5,960,476 A | 10/1999 | Danzy | |
| 5,996,116 A | 12/1999 | Tate | |
| 6,418,562 B1 | 7/2002 | Shwartz et al. | |
| 8,387,412 B2 | 3/2013 | O'Byrne | |
| 2003/0186011 A1* | 10/2003 | Sloot | B32B 9/00 428/40.1 |
| 2004/0176005 A1 | 9/2004 | Nordstrom | |
| 2006/0212993 A1* | 9/2006 | Wang | A42C 5/00 2/171 |
| 2008/0173222 A1 | 7/2008 | Jurnovoy | |
| 2012/0005808 A1* | 1/2012 | Shwartz | B44C 1/105 2/195.1 |
| 2017/0143060 A1* | 5/2017 | Kronenberger | A41D 27/08 |

OTHER PUBLICATIONS

International Search Report and Written Opinion, dated Jan. 6, 2016, in PCT/US15/55669.

International Search Report and Written Opinion, dated Mar. 8, 2018, in International Patent Application No. PCT/US2018/012493.

\* cited by examiner

ADORNMENT ASSEMBLY FOR AN ARTICLE

CROSS-REFERENCE TO RELATED APPLICATIONS

This application is a continuation-in-part of U.S. patent application Ser. No. 14/323,157, filed Jul. 3, 2014.

BACKGROUND OF THE INVENTION

Field of the Invention

This invention relates to adornment as used on articles, such as apparel articles.

Background Art

The apparel industry, which represents one category of "article" to which the invention herein relates, continues to be one of the most competitive consumer industries worldwide. Appearance is generally one of the most critical selling points for virtually all apparel. As a result, those in the industry have invested, and continue to invest, enormous sums in different ways to adorn apparel to make it more visually appealing than the apparel of their competitors.

Toward this end, one focus has been upon discrete adornment that is provided on virtually all types of apparel. This category includes a wide range of adornment types. The adornment may be in the form of a logo, informational lettering, an eye-catching design, representations of persons, places, and things, etc.

Most commonly, this type of ornamentation is applied at a continuous exposed surface of the article. That surface is normally defined by an outer layer that may be a cloth material, leather, etc.

As one example, ornamentation is commonly formed by embroidering a pattern directly upon an outer layer defining the exposed surface of the article. The embroidery process may utilize threads that contrast with the color and/or texture of the exposed outer layer to produce an obvious contrast to highlight the added material.

Embroidery has some inherent drawbacks. First of all, embroidery equipment involves a significant financial investment. Further, the embroidery process typically produces a flat design. Multiple layers may have to be formed to produce a noticeable 3-dimensional projection on the exposed surface, if that look is desired. Additionally, it is difficult to make a sharp and distinct transition between the embroidered thread and the edge thereof at which the underlying surface is exposed. Instead, a somewhat rough edge is commonly produced which is worsened by thicker threads. Still further, it is difficult to form intricate shapes using the embroidery process, particularly when the shapes have a small footprint.

Another problem that arises with embroidery relates to the cutting of substrates to appropriately match an embroidered pattern when the embroidery is applied as part of a process to pre-form a patch for subsequent application. Oftentimes embroidered patterns are applied in varying free form designs. It may be difficult thereafter to set up the cutting equipment to make a desired matching perimeter edge, particularly since embroidered patterns may become random and numerous. Potentially, dies would be required for each variation.

As one example, the substrate is cut first to a particular embroidery pattern to be made. Precise alignment is required to properly match the cut substrate with the embroidery equipment. This can become expensive and lead to rejects and high cost per unit.

Woven ornamentation can be formed using a process that allows rather intricate shapes to be precisely formed with sharp transition edges, even with a design having a small areal extent. The weaving process is one that generally involves high end equipment that, as embroidery, demands a significant up-front equipment investment.

Another widely used method of producing ornamentation is to perform a screen printing operation. Once again, it is difficult to form precise shapes using this process. Further, the overall quality of screen printed ornamentation is generally less than that of the counterparts made by embroidery and weaving processes. Additionally, the integrity of the screen printed material depends upon the tenacity of its adherence to the substrate. On cloth, the degree of adherence is difficult to control. Even in a best case situation, over time, the screen printed material is prone to cracking, being rubbed off, and/or fading, which may detract significantly from the overall appearance of the associated article.

Pre-formation of a patch or label commonly is carried out using a variety of techniques other than embroidery. Heretofore, the pre-formed patches have been made with a multitude of different structural variations. Commonly, layers are stacked to highlight visually contrasting materials, designs, and colors. This stacking process creates a number of different problems.

First of all, the stacking of multiple layers produces a stepped appearance which may not be desirable. Multiple stacked layers may also produce a generally thickened patch configuration which may be undesirable.

Further, when components or layers are stacked on underlying layers with different footprints, it is generally difficult to create a neat appearance at the front of the patch. For example, overlying layers may be held in place by stitching. This exposed stitching may be visually unappealing.

It is also generally difficult to maintain perimeter edges of overlying layers in intimate contact with an immediately underlying surface. This condition may worsen as the materials wrinkle, warp, and/or fray.

Still further, this stacked construction tends to create edges that make the patch prone to snagging on foreign objects when the apparel items are used during normal activities. For apparel items that are washed, this snagging problem becomes aggravated as normal washing techniques cause the patch to be dragged against parts of the apparel item with which it is associated and/or other items being washed.

The above issues have generally limited the ability of manufacturers to make certain eye-catching ornamentation.

The industry continues to seek out improved techniques for creating and applying ornamentation to all types of apparel articles, such as headwear, shirts, pants, blouses, accessories, etc. The driving design objectives are typically to produce a visually appealing, high quality, long lasting ornamentation that can be applied at a reasonable price.

SUMMARY OF THE INVENTION

In one form, the invention is directed to an adornment assembly for an article. The adornment assembly includes a base assembly having a plurality of layers in stacked relationship that together define a combined thickness. The plurality of layers consists of at least: a) a first layer with a thickness between oppositely facing first and second surfaces; and b) a second layer with a thickness between oppositely facing third and fourth surfaces. The first surface is applied to an exposed surface on an article. The base assembly has an exposed surface on one of the plurality of layers that faces oppositely to the first surface. A discrete component has a thickness between oppositely facing component surfaces. The discrete component is applied to the base assembly so that one of the oppositely facing component surfaces is exposed for viewing together with the exposed surface on the one of the plurality of layers on the base assembly. The discrete component is applied to the base assembly so that at least a part of the thickness of the discrete component resides within the combined thickness of the base assembly.

In one form, substantially the entire thickness of the discrete component resides within the combined thickness of the base assembly.

In one form, the plurality of layers includes the first and second layers and at least one additional layer.

In one form, at least one, but not all, of the plurality of layers is made from a felt material.

In one form, the one of the plurality of layers having the exposed surface has a receptacle to receive the discrete component.

In one form, the one of the plurality of layers having the exposed surface has a thickness. The receptacle extends through the full thickness of the one of the plurality of layers having the exposed surface.

In one form, the receptacle is formed in the one of the plurality of layers having the exposed surface and at least one additional layer in the plurality of layers.

In one form, the one of the plurality of layers having the exposed surface is a fabric made from yarns and/or threads that are woven and/or knitted.

In one form, the discrete component has a woven design thereon.

In one form, the discrete component has a perimeter edge. The adornment assembly further includes a border bead that surrounds at least part of the perimeter edge of the discrete component and resides at least partially within the combined thickness of the base assembly.

In one form, the one of the plurality of layers having the exposed surface has a receptacle with a shape to at least nominally match the shape of the perimeter edge of the discrete component. There is a gap at least partially around the perimeter edge of the discrete component with the discrete component in the receptacle into which the border bead is placed.

In one form, one of the oppositely facing component surfaces is substantially flush with the exposed surface on the one of the plurality of layers.

In one form, the thickness of the first layer is greater than the thickness of the second layer.

In one form, a surface on another of the plurality of layers is exposed for viewing together with the exposed surface on the one of the plurality of layers and one of the oppositely facing component surfaces.

In one form, the another one of the plurality of layers with the exposed surface is secured to another of the plurality of layers by at least one of: a) an adhesive; and b) stitching.

In one form, the adornment assembly for an article is provided in combination with an article to which the adornment assembly is secured.

In one form, the one of the plurality of layers with the exposed surface has a receptacle formed therein and the base assembly is secured to the article by stitching that is directed into the receptacle and the article.

In one form, the article is an apparel article that is configured to be worn or transported by a user.

In one form, the base assembly is secured to the article using at least one of stitching and an adhesive.

In one form, the discrete component is secured to the base assembly using at least one of stitching and an adhesive.

DETAILED DESCRIPTION OF THE PREFERRED EMBODIMENT

Figure 1:
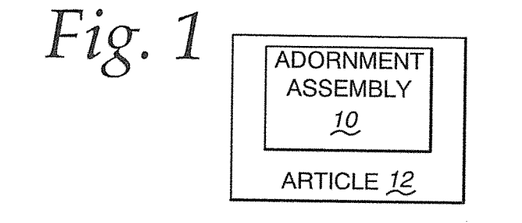
FIG. 1 is a schematic representation of an adornment assembly, according to the present invention, integrated into an article.

Referring to FIG. 1, an adornment assembly, according to the present invention, is shown in schematic form at 10 as integrated into an article 12 to adorn that article. The adornment assembly 10 and article 12 are shown in schematic form to encompass virtually a limitless number of different variations of each. The article 12, into which the adornment assembly 10 is integrated, may be virtually any type of article, but is preferably an article fitting in the category of "apparel". As one specific example, the adornment assembly 10 will be described below as integrated into a headwear piece, and specifically a baseball-style cap.

The adornment assembly 10 may also take virtually a limitless number of different forms. The adornment may be in the form of a logo, informational lettering, eye-catching designs, representations of persons, places, and things, etc. The invention contemplates virtually any type of addition made to the article 12 that serves an ornamental, aesthetic, or informational purpose.

To describe the invention, an exemplary design consisting of the letter "I" and a circular "dot" are shown formed in an adornment assembly in FIGS. 2-8. As noted above, the nature of the design itself is not critical to the present invention.

Figure 7:
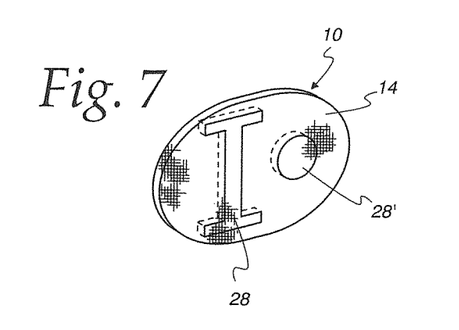
FIG. 7 is a perspective view of the adornment assembly cut from the first layer.
Figure 8:
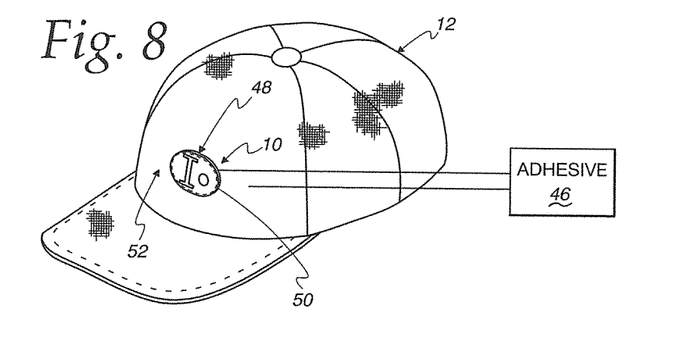
FIG. 8 is a reduced, perspective view of the adornment assembly in FIG. 7 integrated into an article in the form of a baseball-style cap.

A first layer 14 is used to form the adornment assembly 10, which is shown in completed form in FIGS. 7 and 8. The first layer 14 has a thickness T between first and second oppositely facing surfaces 16, 18, respectively. The first layer 14 may be a continuous supply of material or a discrete quantity thereof.

Figure 2:
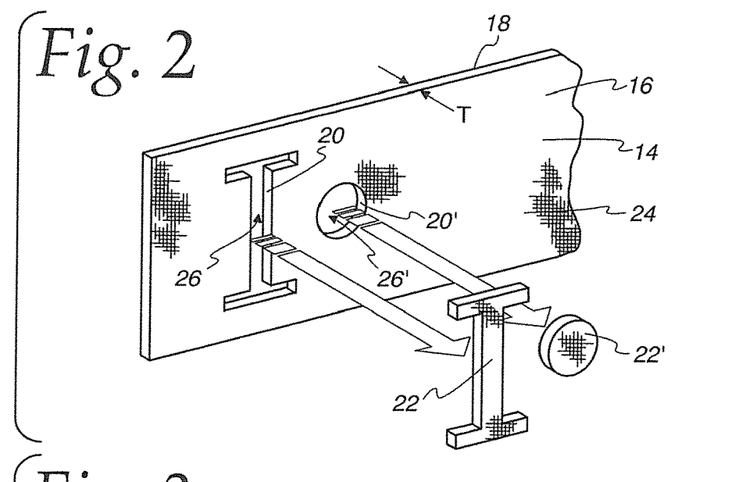
FIG. 2 is an exploded, perspective view showing a layer from which discrete pieces have been cut and separated to initiate the formation of one specific form of the inventive adornment assembly.

Using well-known technology, the first layer 14 is cut fully between the first and second surfaces 16, 18 along first border edges 20, 20' that surround discrete pieces 22, 22' of the first layer 14. As shown in FIG. 2, the discrete pieces 20, 22 are separated from a remaining portion 24 of the first layer 14 to thereby produce spaced voids/receptacles 26, 26' within the first border edges 20, 20'.

Figure 3:
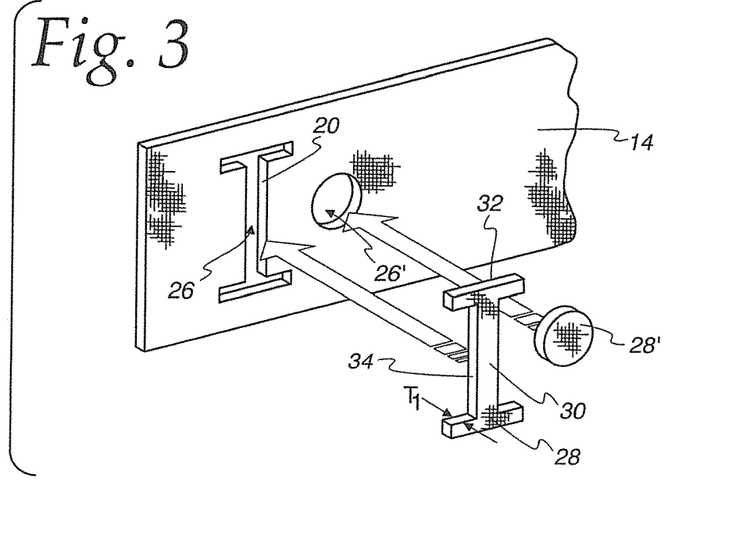
FIG. 3 is a view as in FIG. 2 wherein pre-formed insert pieces are being directed towards voids formed by the removed discrete pieces in FIG. 2.

As shown in FIG. 3, pre-formed insert pieces 28, 28' are provided that are configured to fit within the voids 26, 26', respectively. Exemplary insert piece 28 has a thickness T1 between third and fourth surfaces 30, 32, respectively, and a second border edge 34 having a shape that conforms to the shape of at least a portion of the first border edge 20. In this embodiment, the second border edge 34 conforms in shape to the first border edge 20 along its entire extent.

As shown at FIG. 3, the insert pieces 28, 28' are pressed into their respective voids 26, 26' with the insert pieces 28, 28' initially pre-aligned so that the exemplary second border edge 34 is placed against, or immediately adjacent to, the first border edge 20 along the portions of the first and second border edges 20, 34 where the first and second border edges 20, 34 conform in shape. In this embodiment, there is shape conformance along the full extent of each border edge 20, 34.

The insert pieces 28, 28' are then appropriately fixed to the remaining portion 24 of the first layer 14 by any of a number of different suitable means. It is possible that the insert pieces 28, 28' can be dimensioned relative to the dimensions of the voids 26, 26' so that the insert pieces 28, 28' are adequately held through frictional forces alone. The nature of the material making up the first layer 14 and insert pieces 28, 28', and the size of the insert pieces 28, 28' may contribute to making this possible.

Figure 5:
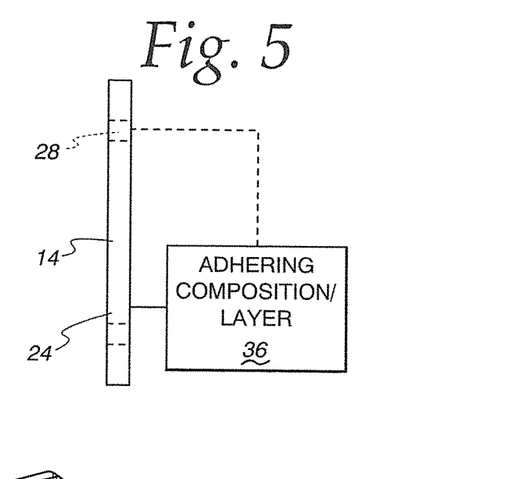
FIG. 5 is a view as in FIG. 4 and showing an alternative structure for fixing the insert pieces in the voids.
Figure 6:
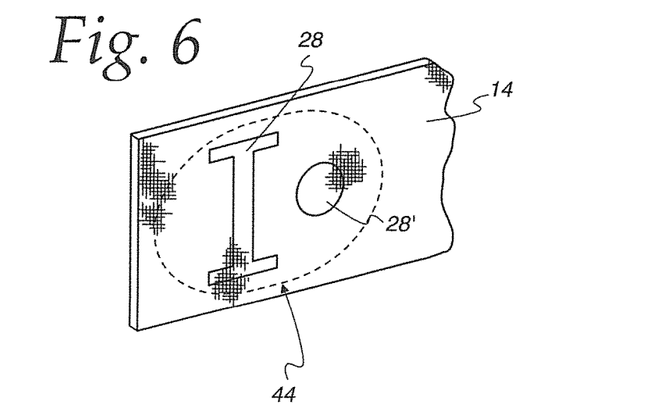
FIG. 6 is a view as in FIG. 3 with the insert pieces directed into the voids and with a desired end shape for the adornment assembly outlined in dotted lines.

Alternatively, as disclosed schematically in FIG. 5, an adhering composition/layer 36 may be used to fix the exemplary insert piece 28 to the remaining portion 24 of the first layer 14. The adhering composition 36 may be applied to act between the border edges 20, 34 and/or at the second and fourth surfaces 18, 32.

Figure 4:
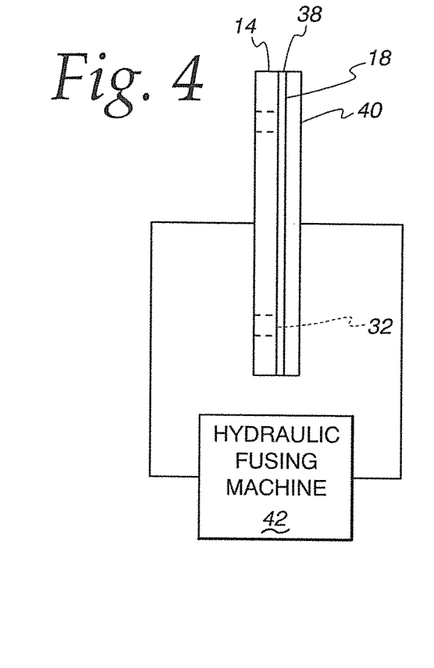
FIG. 4 is a side elevation view of the layer in FIG. 3 with the insert pieces directed into respective voids and with separate backing layers fixed through an hydraulic fusing machine.

Alternatively, as shown in FIG. 4, one or more backing layers 38, 40 may be applied at the second and fourth surfaces 18, 32. The first backing layer 38 may incorporate an adhesive. Preferably, the backing layer 38 is in the form of a double-sided fusible material. The backing layer 40 may be fixed against the first backing layer 38. In one form, an hydraulic fusing machine 42 may be used to fix the layers 38, 40 through a conventional fusion process.

Once the insert pieces 28, 28' are fixed, the adornment assembly 10 is effectively completed. The first layer 14 may initially be in a starting shape that represents the overall, end, desired configuration for the adornment assembly 10, as shown in FIGS. 7 and 8. Alternatively, the final desired shape may be cut from the first layer, as along the dotted line at 44 in FIG. 6, to allow cutting through the thickness of the first layer 14 to separate the adornment assembly 10, as shown in FIGS. 7 and 8.

As shown in FIG. 8, the adornment assembly 10 can be applied to an article 12, in this case shown as an exemplary headwear piece in the form of a baseball-style cap. The adornment assembly 10 is integrated into the article 12 preferably by use of at least one of an adhesive 46, and a line of stitching 48 that may extend partially or fully around, and slightly within, the perimeter edge 50 of the adornment assembly 10.

The insert pieces 28, 28' and remaining portion 24 of the first layer 14 may be fixed together as an incident of integrating the adornment assembly 10 into the article 12. For example, adhesive 46 applied to an exposed surface 52 of the article 12 may secure the first layer 14 and the insert pieces 28, 28' to the article 12 without requiring a separate fixing step.

The thicknesses T, T1, respectively of the first layer 14 and insert piece 28, may be the same or different represents the depth of the void/receptacle 26. In one preferred form, the thicknesses T, T1 are the same so that the first and third surfaces 16, 30 are flush with the insert piece 28 pressed into the void 26. Alternatively, by making the thicknesses T, T1 different, the insert piece 28 can be either recessed within the void 26 or project slightly therefrom.

The first and third surfaces are preferably such as to be visually contrasting so that the insert pieces 20, 28' can be clearly discerned against the first layer 14. Preferably, this contrast is provided at the border edges 20, 34 for the exemplary insert piece 28. It is thus possible to make a sharp and distinct transition where the border edges 20, 34 meet or are in closely adjacent relationship.

The contrast does not have to be over the entire areal extent of the insert pieces 26, 26' at the first and third surfaces 18, 30. The contrast may be by reason of a difference in color, texture, or any other property that produces a visual contrast between the surfaces 16, 30.

Figure 9:
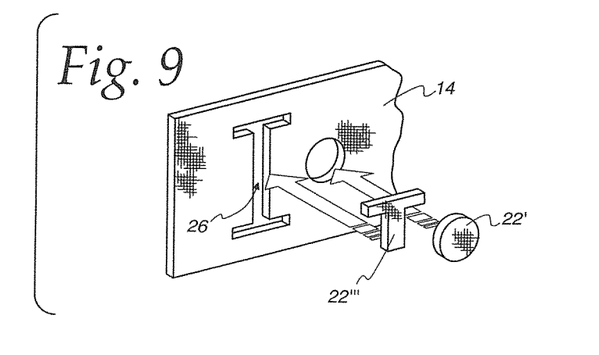
FIG. 9 is a view as in FIG. 2 using a modified form of insert piece that does not fully conform to a void into which it is directed.
Figure 10:
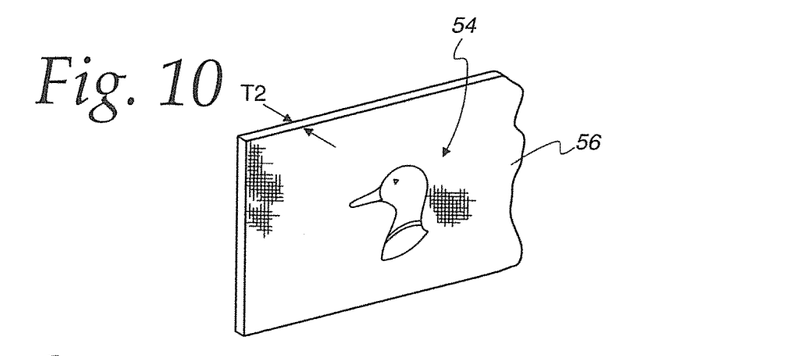
FIG. 10 is a perspective view of a layer having a pattern formed thereon to initiate formation of a modified form of adornment assembly, according to the invention.

While in one preferred form, each of the insert pieces 28, 28' closely conforms in shape around its outside perimeter edge to the inside perimeter edge bounding the respective void 26, 26', the invention contemplates a lesser conforming relationship. For example, in FIG. 9, the insert piece 22''', corresponding to the insert piece 22, fills only a portion of the void 26. The unfilled portion of the void 26 may provide a contrast by reason of the viewing therethrough of the exposed surface 52 of the article 12 upon which the adornment assembly 10 is applied.

In an alternative form, as shown in FIGS. 10-16, a pattern at 54 may be provided on a layer 56 with a thickness T2. In this embodiment, the pattern 54 is shown in the form of a duck's head, which is only exemplary in nature. The pattern 54 may be any shape or form that is provided for aesthetic and/or informational purposes. The pattern 54 may be applied to the layer 56 by any conventional means, including embroidery, weaving, screen printing, etc.

Figure 11:
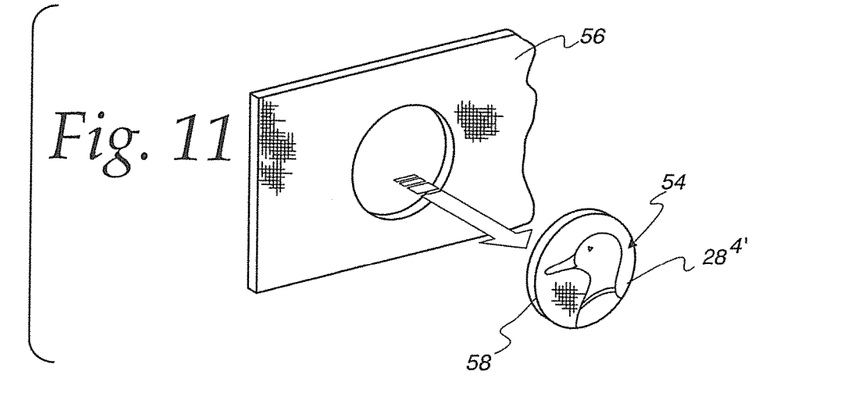
FIG. 11 is a view as in FIG. 10 wherein the layer has been cut to define an insert piece including the pattern.

After forming the pattern 54 on the single layer 56, an insert piece $28^{4'}$ is produced by cutting through the thickness T2 of the layer 56 to separate the insert piece $28^{4'}$ fully therefrom. The insert piece $28^{4'}$ has a resulting perimeter border edge 58 that extends fully around the pattern 54.

Figure 12:
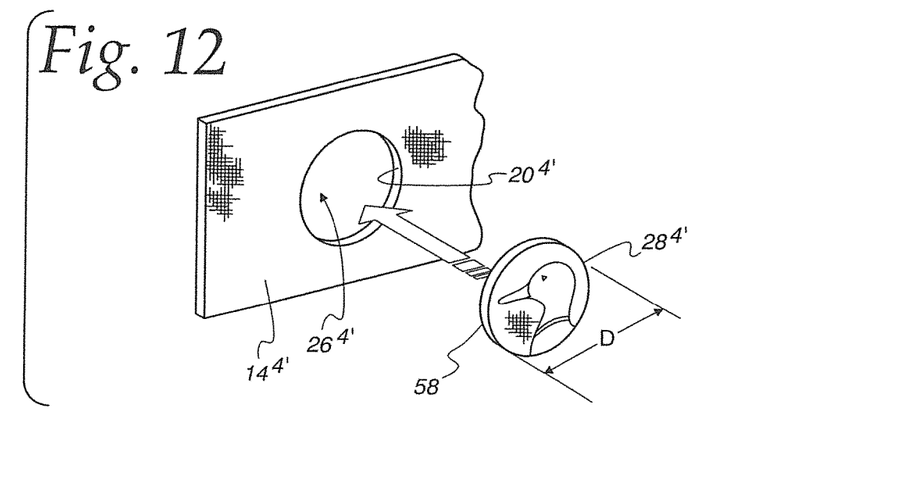
FIG. 12 is a perspective view showing the insert piece being directed into a void formed in a layer as in FIG. 2.

As shown in FIG. 12, the insert piece $28^{4'}$ is then directed into a void $26^{4'}$ in corresponding first layer $14^{4'}$ that is cut out with a border edge $20^{4'}$ matching the perimeter edge 58 at least partially, and more preferably fully, around its running extent. In this embodiment, the insert piece $28^{4'}$ has a circular shape with a diameter D. The circular shape is not a requirement.

Figure 13:
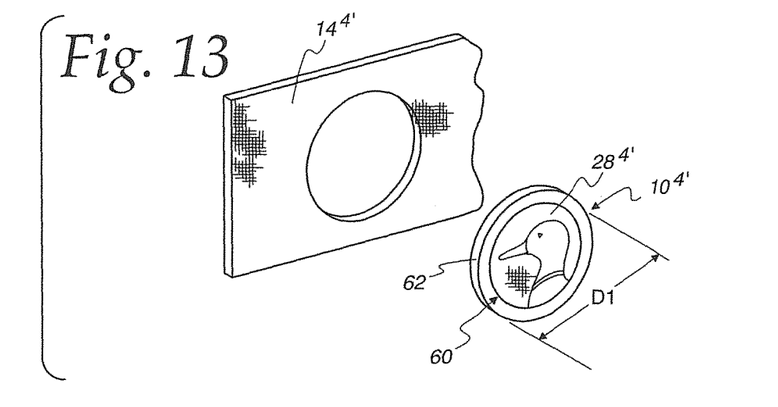
FIG. 13 is a view as in FIG. 12 wherein the insert piece is directed into the void and the first layer is cut to produce the adornment assembly.

As seen in FIG. 13, once the insert piece $28^{4'}$ is pressed into the void $26^{4'}$, the first layer $14^{4'}$ can be in turn cut in a circular shape with a dimension D1 that is greater than the dimension D, thereby producing an adornment assembly $10^{4'}$ with a contrasting border region 60 in the form of a frame that fully surrounds the insert piece $28^{4'}$. It is not necessary that the circular shapes of the insert piece $28^{4'}$ and perimeter outer edge 62 formed by cutting the layer $14^{4'}$ be concentric. In the embodiment shown, that is the case.

Figures 14, 15, 16:
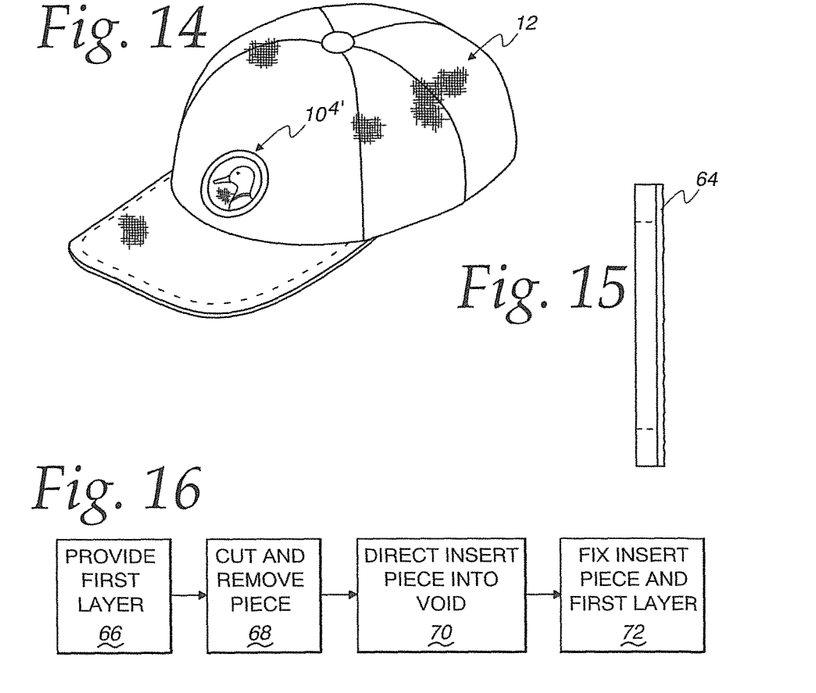
FIG. 14 is a reduced, perspective view of the adornment assembly integrated into a baseball-style cap.
FIG. 15 is a side elevation view of the adornment assembly with an adhesive layer thereon.
FIG. 16 is a flow diagram representation of a method of adorning an article, according to the invention.

The resulting adornment assembly $10^{4'}$ is then integrated into the article 12, shown in FIGS. 14 and 15, as through the use of an adhesive layer 64 and/or through stitching, as shown in FIG. 8 for the adornment assembly 10.

In one preferred form, the first layer 14, $14^{4'}$ is made from a felt material, which may also be used to form the various insert pieces 28, 28', $28^{4'}$. Felt lends itself to precision cutting so that a crisp edge is defined that can be matched closely to an adjacent abutting edge. The precision can be such that the insert pieces 28, 28', $28^{4'}$ are not discernible as elements separate from the first layers 14, $14^{4'}$. At the same time, the felt material has resiliency which allows close press fitting of the insert pieces 28, 28', $28^{4'}$ within their respective complementarily-shaped voids 26, 26', $26^{4'}$. However, virtually any type of material might be utilized with the materials making up the first layer 14, $14^{4'}$ and insert pieces 28, 28', $28^{4'}$ being either the same or different.

As one possible variable, the pattern 54 may be woven on the layer 56 with a construction wherein the thickness T2 of the layer 56 is less than the thickness of the first layer $14^{4'}$. A backing layer, such as the backing layers 38, 40, or another type of backing layer, may be applied to the back of the insert piece $28^{4'}$, with or without the border region 60, to build the thickness of the insert piece $28^{4'}$ up to that of the first layer $28^{4'}$ may be flush with the front of the first layer $14^{4'}$. A protruding or recessed arrangement is also contemplated for the insert piece $28^{4'}$, with or without the border region 60.

With the structures described above, a method of adorning an article can be carried out as shown in block diagram form in FIG. 16.

As shown at block 66, a first layer is provided having first and second surfaces.

As shown at block 68, the first layer is cut fully between the first and second surfaces along a first border edge that surrounds a discrete piece of the first layer. The discrete piece of the first layer is separated from a remaining portion of the first layer to produce a void within the first border edge.

As shown at block 70, a pre-formed insert piece is provided that is configured to fit within the void. The insert piece has a thickness between third and fourth surfaces and a second border edge having a shape that conforms to a shape of at least a portion of the first border edge.

As shown at block 70, the insert piece is directed into the void with the void and insert piece pre-aligned so that the second border edge is placed against, or immediately adjacent to, the first border edge along portions of the first and second border edges where the first and second border edge shapes conform.

As shown at block 72, with the insert piece directed into the void, the insert piece and remaining portion of the first layer are fixed together to define the adornment assembly.

In carrying out one form of the invention, the parts of the adornment assembly may be cut by a programmable blade cutting machine where the pattern to be struck can be aligned while the outer perimeter of the substrate is being cut. Simultaneous alignment and cutting can occur to avoid the existing problems, particularly associated with free form embroidery.

Figure 17:
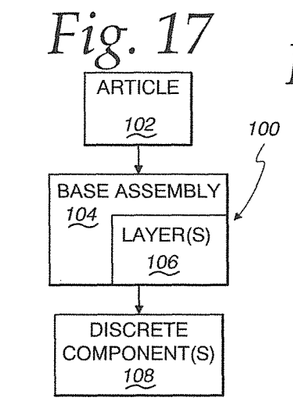
FIG. 17 is a schematic representation of an adornment assembly, according to the present invention, including a base assembly made of multiple layers and having a discrete component incorporated therein, with the base assembly attached to an article.

Another form of the invention is shown in schematic form in FIG. 17. In FIG. 17, an adornment assembly is shown at 100 for application to an article 102, that may be virtually any type of article to which adornment is applied. As with the structure described above, the article may be in the category "apparel", which is used throughout for exemplary purposes only. The adornment assembly 100 may be used on any type of article on which discrete adornment is commonly applied.

The adornment assembly 100 consists of a base assembly 104 made up of a plurality of layers 106 including at least first and second layers. Any number of layers is contemplated—including three or more. The layers 106 collectively cause the base assembly 104 to have a combined thickness between a surface on one of the layers 106, facing and applied to the article 102, and an oppositely facing surface on one of the layers 106 that is exposed for viewing. At least one discrete component 108 is applied to the base assembly 104 so that a surface on the at least one discrete component 108 is exposed for viewing together with the exposed surface on the base assembly 104. The at least one discrete component 108 is applied to the base assembly 104 so that at least a part of the thickness of the discrete component 108 resides within the combined thickness of the base assembly 104.

The schematic showing in FIG. 17 is intended to encompass the specific forms described hereinbelow, as well as virtually an unlimited number of variations of the components therein and their particular combinations. Specific exemplary forms of the adornment assembly 100 will now be described.

Figure 18:
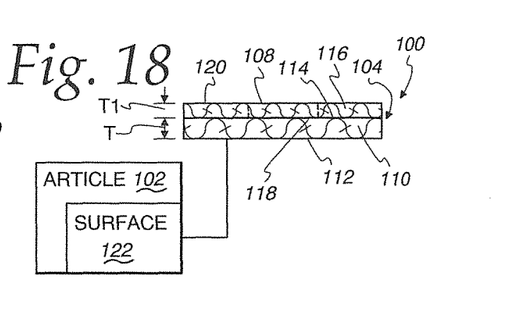
FIG. 18 is a side elevation view of one specific form of the adornment assembly of FIG. 17.
Figure 19:
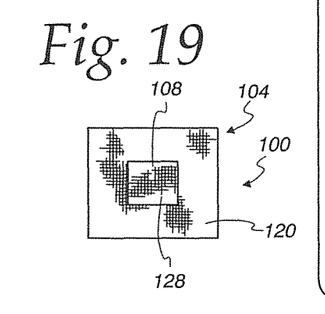
FIG. 19 is a front elevation view of the adornment assembly in FIG. 18.
Figure 20:
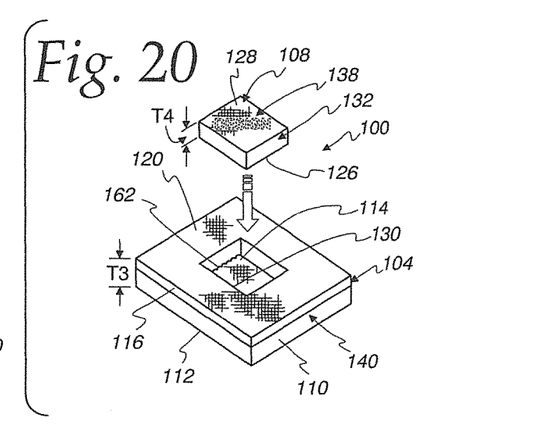
FIG. 20 is an exploded perspective view of the adornment assembly in FIGS. 18 and 19.

In FIGS. 18-20, the adornment assembly 100 has a base assembly at 104 made up of: a) a first layer 110 with a thickness T between oppositely facing first and second surfaces 112, 114, respectively; and b) a second layer 116 with a thickness T1 between oppositely facing third and fourth surfaces 118, 120, respectively. The first and second layers 112, 116 are in stacked relationship so that they together define a combined thickness T3 between the first surface 112 and the oppositely facing fourth surface 120, that remains exposed to viewing with the first surface 112 applied to an exposed surface 122 on the article 102.

Figure 21:
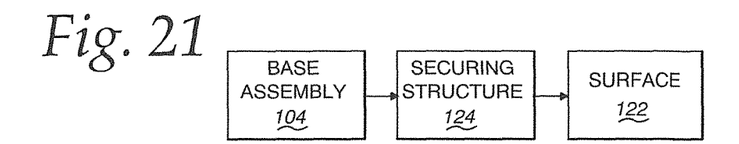
FIG. 21 is a schematic representation of structure for securing the base assembly to a surface on an article.

As shown schematically in FIG. 21, the base assembly 104 is secured to the article surface 122 through any suitable securing structure 124 well-known to those skilled in the art. The securing structure 124 may be in the form of stitching, an adhesive, with or without heat sealing, etc.

The discrete component 108 is applied to the base assembly 104 and is made up of a single layer with oppositely facing surfaces 126, 128. The discrete component 108 has a thickness T4 between the oppositely facing component surfaces 126, 128.

The second layer 116 is cut out, or otherwise formed, to define a receptacle 130 that is preferably at least nominally, and potentially closely, matched to the shape of a perimeter edge 132 of the discrete component 108. The discrete component 108 is pressed into the receptacle 130 so that the surface 126 abuts a surface bounding the bottom of the receptacle 130. In this case, the receptacle 130 is formed fully through the thickness T1 so that the receptacle 130 is bounded by the second surface 114 on the first layer 110.

Figure 22:
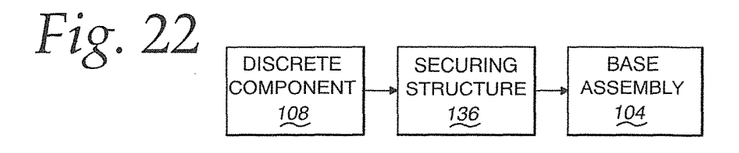
FIG. 22 is a schematic representation of structure for securing the discrete component on the base assembly.

As shown at FIG. 22, the discrete component 108 is secured to the base assembly 104 using securing structure 136 that may take any form known to those skilled in the art. For example, the securing structure 136 may be thread, an adhesive with or without heat sealing, a combination thereof, etc.

As depicted, the discrete component 108 has a thickness T4 that is approximately equal to the thickness T1 of the second layer 116. The thickness T4 may be greater or less than the thickness T1, in which case the surface 128 is respectively above, and recessed below, the fourth surface 120.

The layers 110, 116 may be made from virtually any type of material. In one preferred form, the first layer 110 is made from felt, suede, non-woven material, etc. This category of material can be positively secured to article surfaces, as through adhesives, and provides a solid foundation for one or more additional overlying layers—in this case, the second layer 116. At the same time, it lends itself to being cut precisely to desired shapes and is not prone to fraying or shredding, as might compromise its integrity or appearance. Further, felt, and the like, heat seals effectively to facilitate adhesive bonding of components thereto.

The second layer 116 may be made from the same material as the first layer 110 but is more preferably a thinner sheet of fabric that is made from polyester and/or natural yarns and/or threads that are woven and/or knitted. The fourth surface 120 will be viewable together with any design, shown generically at 138 in FIG. 20, on the surface 128 of the discrete component 108. The design 138 may be anything commonly used to adorn articles, such as logos, words, pictures, etc., or may be as simple as a solid color or fabric pattern. It has been found that dramatic effects can be realized by using what is commonly referred to as "reflection technology fabrics" for the second layer 116, and potentially for part, or all, of the discrete component 108, such as those utilizing sheen, glitter, shimmer, sparkling reflection, etc. on polyester fabric face up.

The discrete component 108 may have any construction ranging from a solid design to constructions capable of producing intricate designs, such as weaving. Virtually any other type of structure capable of producing a visible design 138 is contemplated. As examples, the design 138 may be generated by at least one of weaving, dyeing, screen printing, embroidery, etc. The invention contemplates any method, apart from those specifically identified, capable of producing the design 138 that may have contrasting textures and/or colors, or solid colors. The discrete component 108 is shown in a pre-formed configuration but could be formed in situ.

The appearance of the first and second layers 110, 116 is preferably coordinated at the peripheral edge 140 of the base assembly 104. By matching color and/or texture, the peripheral edge 140 can appear as a single thickness. Alternatively, a contrasting appearance may be desired.

Figure 23:
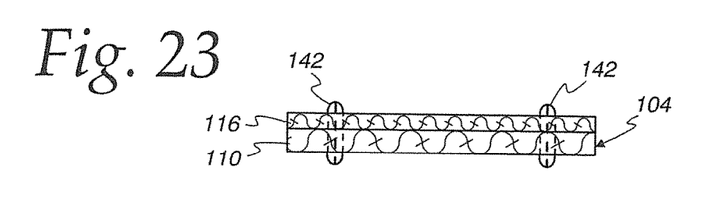
FIG. 23 is a view as in FIG. 18 and showing the adornment assembly pre-formed with layers held together by stitching.
Figure 24:
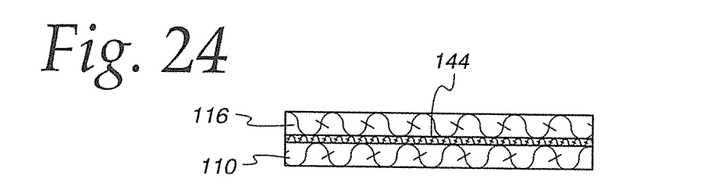
FIG. 24 is a view as in FIG. 23 with the layers held together by an adhesive.

As shown in FIG. 23, the layers 110, 116 may be joined through stitching 142 to pre-form the base assembly 104 into a patch/label before application to the article 102. Alternatively, an adhesive layer 144, as shown in FIG. 24, can be used to join the layers 110, 116 to thereby pre-form the base assembly.

Figure 25:
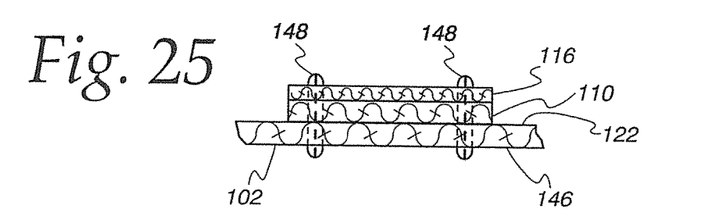
FIG. 25 is a view as in FIGS. 23 and 24 with the adornment assembly formed while being stitched to an article.

In an alternative construction, shown in FIG. 25, the layers 110, 116 may be joined and secured against a surface 122 formed on a layer 146 on the article 102 simultaneously, as by the use of stitching 148. Adhesive alone and/or stitching might be utilized to make this simultaneous securement.

The perimeter shapes of the layers 110, 120, described to this point, are matched. However, this is not required. As shown for the adornment assembly 100' in FIG. 26, the corresponding fourth surface 120' is configured so that the corresponding second surface 114' is exposed for viewing fully therearound. As depicted, the perimeter shapes of the layers 110', 116' are different. The same is true with respect to the discrete component 108', which can have any shape that may be the same as, or different than, the shape of one or both of the layers 110', 116'.

Figure 26:
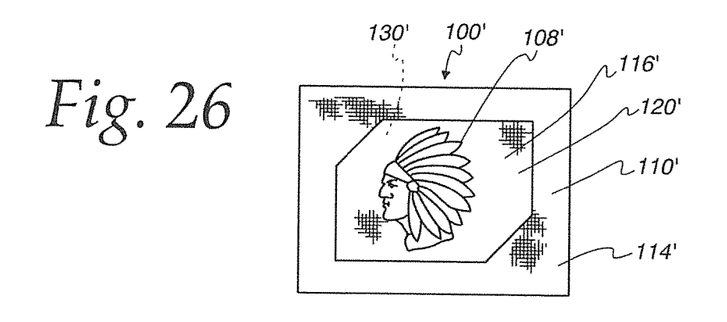
FIG. 26 is a front elevation view of a modified form of adornment assembly according to the invention.

As depicted in FIG. 26, the discrete component 108' is in the shape of the head of a Native American with traditional headdress. The second layer 116' may be laid facially against the first layer 110' so that the thicknesses of the layers 110', 116' are stacked. Alternatively, the first layer 110' may be cut out to produce a receptacle 130' for a part of the thickness, or the full thickness, of the second layer 116', the latter being possible if the thickness of the layer 116' is less than or equal to the thickness of the layer 110'. The receptacle depth may be such that the fourth surface 120' projects above the second surface 114' or is recessed therebelow. A fully surrounding "frame" look is produced by the surface 114'.

Figure 27:
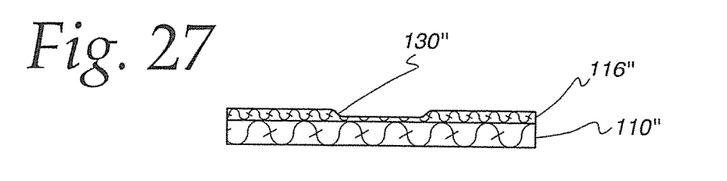
FIG. 27 is a cross-sectional view of a further modified form of adornment assembly according to the invention.

In FIG. 27 a further variation is shown wherein a receptacle 130" is formed in a corresponding second layer 116" overlying a corresponding first layer 110". In this embodiment, the receptacle 130" has a depth that extends only partially through the thickness of the second layer 116". The second layer 116" may be cut out or compressed to produce the receptacle 130".

Figure 28:
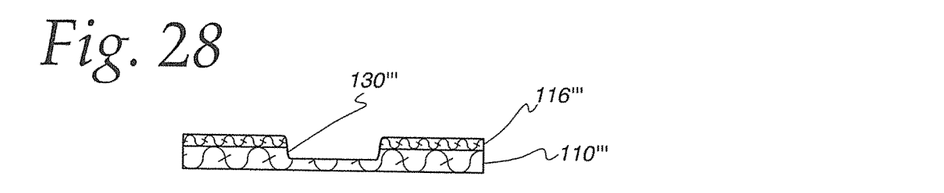
FIG. 28 is a cross-sectional view of a further modified form of adornment assembly according to the invention.

In FIG. 28, a variation is shown wherein the receptacle 130''' is formed fully through the second layer 116''' and partially through the first layer 110'''.

Figure 29:
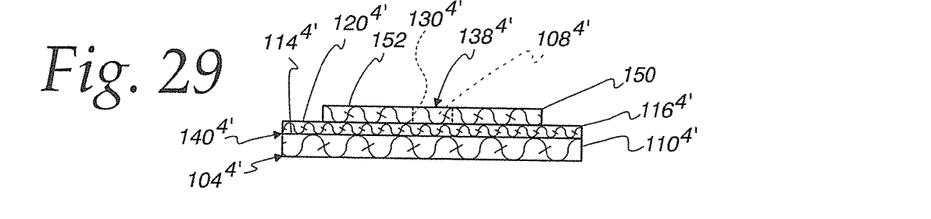
FIG. 29 is a side elevation view of a further modified form of adornment assembly, according to the invention, and including an additional layer.

In FIG. 29, a further modification is shown wherein a third layer 150 is stacked upon corresponding first and second layers 110⁴', 116⁴' to produce a base assembly 104⁴'. In one preferred construction, the second and third layers 116⁴, 150 are made from the same category of material, such as the aforementioned "reflection technology fabrics". A discrete component 108⁴' is incorporated into the third layer 150. With this construction, the discrete component 108⁴' might be set into a receptacle 130⁴' in the corresponding base assembly 104⁴' that extends fully through the thickness of the third layer 150 or partially therethrough. Alternatively, in the former case, the receptacle might extend partially or fully through the thickness of the second layer 116⁴' and, in the latter case, potentially partially through the thickness of the first layer 110⁴'.

The base assembly 1044 is constructed with many potentially different appearances. The perimeter shapes and sizes of the layers 110⁴', 116⁴', 150 may be the same. In that case, the multiple layer construction primarily provides a way to vary the appearance of the peripheral edge 140⁴' of the base assembly 104⁴'. By changing shape and size, different portions of a surface 152 on the third layer 150 and surfaces 114⁴' on the layer 110⁴' and 120⁴' on the layer 116⁴' can be selectively exposed for simultaneous viewing in conjunction with the design 138⁴' on the discrete component 108⁴'. A single fully surrounding frame look, or a frame inside of a frame look, may be produced by controlling the footprints of the various layers.

Recessing of the layer 150 into the layer 116⁴' and/or the layer 116⁴' into the layer 110⁴' are also contemplated. All of these variations can be coordinated with the design 138⁴' on the discrete component 108⁴'.

Figure 30:
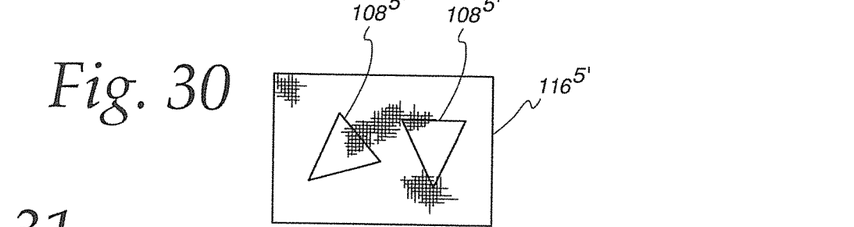
FIG. 30 is a front elevation view of a further modified form of adornment assembly according to the invention.

In a further variation as shown in FIG. 30, the uppermost layer, which in the two-layer configuration corresponds to the second layer as identified in FIG. 30 as 116⁵', may be formed with receptacles to accommodate multiple discrete components 108⁵'.

Figure 31:
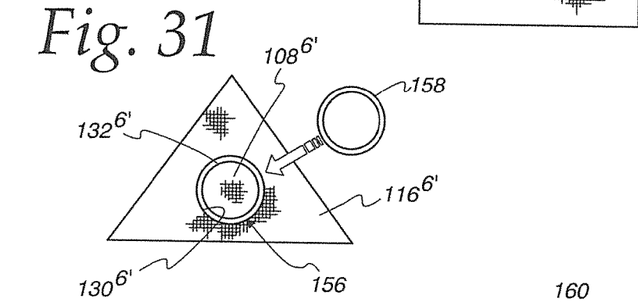
FIG. 31 is an exploded, front elevation view of a further modified form of adornment assembly, according to the present invention, and including a border bead.

In another variation, as shown in FIG. 31, a second layer 116⁶' has a receptacle 130⁶' for a discrete component 108⁶' bounded by an edge that is larger than the facing perimeter edge 132⁶' for the discrete component 108⁶'. This leaves a peripheral gap 156. A border bead 158 is formed to be placed in, and fill, the gap 156 directly between the discrete component 108⁶' and second layer 116⁶'. The border bead 158 may be suitably secured, as by an adhesive, with a flush, projecting, or recessed construction.

Figure 32:
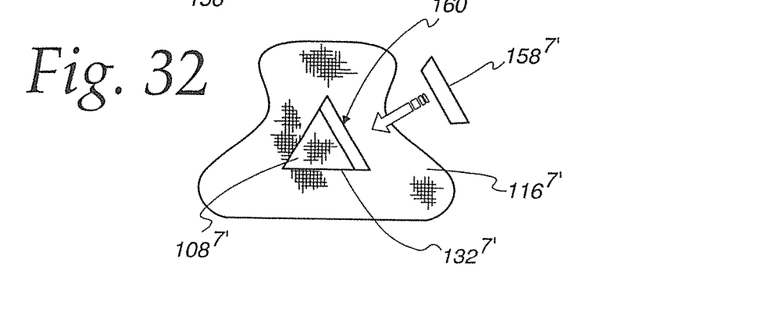
FIG. 32 is a view as in FIG. 31 of a further modified form of adornment assembly, according to the invention, and utilizing a different configuration of border bead.

As shown in FIG. 32, a second layer 116⁷' may have a gap 160 that extends only partially around the peripheral edge 132⁷' of the discrete component 108⁷'. A suitably shaped border bead 158⁷' is secured in the gap 160. The border bead 158⁷' may be flush with, project above, or be recessed below, the surface 120⁷'.

The use of the border beads 158, 158⁷' adds another tool for design variation.

The peripheral gaps 156, 160 provide a location whereat stitching can be formed to join layers or an entire base assembly to the article 102. This location allows for the stitching to be hidden and ultimately covered by the border bead 158, 158⁷'.

As seen in FIG. 20, the receptacle 130 also provides a location for hidden stitching identified at 162. After the stitching 162 is formed, the discrete component 108 will hide the same once directed into the receptacle 130.

It should be understood that the above embodiments are exemplary in nature only. The basic elements in each of the variations might be used in different combinations to open up a virtually unlimited potential for creating visually appealing ornamentation.

The foregoing disclosure of specific embodiments is intended to be illustrative of the broad concepts comprehended by the invention.

The invention claimed is:

1. An adornment assembly for an article, the adornment assembly comprising:
a base assembly comprising a plurality of layers in stacked relationship that together define a combined thickness,
the plurality of layers comprising at least: a) a first layer with a thickness between oppositely facing first and second surfaces; and b) a second layer with a thickness between oppositely facing third and fourth surfaces,
the first surface to be applied to an exposed surface on an article,
the base assembly having an exposed surface on one of the plurality of layers that faces oppositely to the first surface;
a discrete component having a single layer of material, the single layer of material having a thickness between oppositely facing component surfaces,
the discrete component applied to the base assembly so that one of the oppositely facing component surfaces on the single layer of material is exposed for viewing together with the exposed surface on the one of the plurality of layers on the base assembly and the other of the oppositely facing component surfaces on the single layer of material is exposed directly to the base assembly or an article to which the adornment assembly is secured,
the discrete component applied to the base assembly so that at least a part of the thickness of the single layer material resides within the combined thickness of the base assembly.

2. The adornment assembly for an article according to claim 1 wherein substantially the entire thickness of the single layer of material resides within the combined thickness of the base assembly.

3. The adornment assembly for an article according to claim 1 wherein the plurality of layers comprises the first and second layers and at least one additional layer.

4. The adornment assembly for an article according to claim 1 wherein at least one, but not all, of the plurality of layers is made from a felt material.

5. The adornment assembly for an article according to claim 1 wherein the one of the plurality of layers having the exposed surface has a receptacle to receive the discrete component, the receptacle having a depth substantially equal to the thickness of the single layer of material.

6. The adornment assembly for an article according to claim 5 wherein the one of the plurality of layers having the exposed surface has a thickness and the receptacle extends through the full thickness of the one of the plurality of layers having the exposed surface.

7. The adornment assembly for an article according to claim 1 wherein the base assembly has a receptacle to receive the discrete component and the receptacle is formed in the one of the plurality of layers having the exposed surface and at least one additional layer in the plurality of layers.

8. The adornment assembly for an article according to claim 1 wherein the one of the plurality of layers having the exposed surface comprises a fabric comprising yarns and/or threads that are woven and/or knitted.

9. The adornment assembly for an article according to claim 1 wherein the discrete component has a woven design thereon.

10. The adornment assembly for an article according to claim 1 wherein the discrete component has a perimeter edge and the adornment assembly further comprises a border bead that surrounds at least part of the perimeter edge of the discrete component and resides at least partially within the combined thickness of the base assembly.

11. The adornment assembly for an article according to claim 1 wherein one of the oppositely facing component surfaces on the single layer of material is substantially flush with the exposed surface on the one of the plurality of layers.

12. The adornment assembly for an article according to claim 1 wherein the thickness of the first layer is greater than the thickness of the second layer.

13. The adornment assembly for an article according to claim 1 wherein a surface on another of the plurality of layers is exposed for viewing together with the exposed surface on the one of the plurality of layers and one of the oppositely facing component surfaces on the single layer of material.

14. The adornment assembly for an article according to claim 13 wherein the another one of the plurality of layers with the exposed surface is secured to another of the plurality of layers by at least one of: a) an adhesive; and b) stitching.

15. The adornment assembly for an article according to claim 1 in combination with an article to which the adornment assembly is secured.

16. The adornment assembly for an article according to claim 1 in combination with an article to which the adornment assembly is secured, wherein the one of the plurality of layers with the exposed surface has a receptacle formed therein and the base assembly is secured to the article by stitching that is directed into the receptacle and the article.

17. The adornment assembly for an article according to claim 15 wherein the article is an apparel article that is configured to be worn or transported by a user.

18. The adornment assembly for an article according to claim 15 wherein the base assembly is secured to the article using at least one of stitching and an adhesive.

19. The adornment assembly for an article according to claim 1 wherein the discrete component is secured to the base assembly using at least one of stitching and an adhesive.

20. An adornment assembly for an article, the adornment assembly comprising:
   a base assembly comprising a plurality of layers in stacked relationship that together define a combined thickness,
   the plurality of layers comprising at least: a) a first layer with a thickness between oppositely facing first and second surfaces; and b) a second layer with a thickness between oppositely facing third and fourth surfaces,
   the first surface to be applied to an exposed surface on an article,
   the base assembly having an exposed surface on one of the plurality of layers that faces oppositely to the first surface;
   a discrete component having a thickness between oppositely facing component surfaces,
   the discrete component applied to the base assembly so that one of the oppositely facing component surfaces is exposed for viewing together with the exposed surface on the one of the plurality of layers on the base assembly,
   the discrete component applied to the base assembly so that at least a part of the thickness of the discrete component resides within the combined thickness of the base assembly,
   wherein the discrete component has a perimeter edge and the adornment assembly further comprises a border bead that surrounds at least part of the perimeter edge of the discrete component and resides at least partially within the combined thickness of the base assembly,
   wherein the one of the plurality of layers having the exposed surface has a receptacle with a shape to at least nominally match the shape of the perimeter edge of the discrete component and so that there is a gap only partially around the perimeter edge of the discrete component with the discrete component in the receptacle into which the border bead is placed.

21. The adornment assembly for an article according to claim 1 wherein the single layer of material is a fabric layer.

22. The adornment assembly for an article according to claim 20 wherein the border bead resides directly between the perimeter edge of the discrete component and the base assembly.

* * * * *

UNITED STATES PATENT AND TRADEMARK OFFICE
CERTIFICATE OF CORRECTION

PATENT NO. : 10,292,442 B2
APPLICATION NO. : 14/883954
DATED : May 21, 2019
INVENTOR(S) : Ronald Kronenberger Page 1 of 1

It is certified that error appears in the above-identified patent and that said Letters Patent is hereby corrected as shown below:

Column 13 Line 36 Claim 16 should read:
16. The adornment assembly for an article according to claim 1 in combination with an article to which the adornment assembly is secured, wherein the one of the plurality of layers with the exposed surface has a receptacle formed therein and the base assembly is secured to the article by stitching that is directed into the receptacle and the article.

Signed and Sealed this
Twentieth Day of August, 2019

Andrei Iancu
*Director of the United States Patent and Trademark Office*